(No Model.)

A. C. SMITH.
OIL CAN.

No. 546,254. Patented Sept. 10, 1895.

WITNESSES:
J. J. Blauvelt
Chas. E. Dawson

INVENTOR
A. C. Smith.

BY
ATTORNEY

UNITED STATES PATENT OFFICE.

ALBERT C. SMITH, OF DENVER, COLORADO, ASSIGNOR OF ONE-FOURTH TO WILLIAM C. GHOST, OF SAME PLACE.

OIL-CAN.

SPECIFICATION forming part of Letters Patent No. 546,254, dated September 10, 1895.

Application filed March 25, 1895. Serial No. 543,091. (No model.)

*To all whom it may concern:*

Be it known that I, ALBERT C. SMITH, a citizen of the United States of America, residing at Denver, in the county of Arapahoe and State of Colorado, have invented certain new and useful Improvements in Oil-Cans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in oil-cans, and is specially designed for use as a receptacle for explosive liquids, as coal-oil, gasoline, alcohol, &c.

My improved can is so constructed as to render it impossible for fire to reach the gas in the can *via* the nozzle from which the liquid is poured. My device is constructed on the principle that explosions can take place only by igniting the gas confined in the space above the liquid in the can. I therefore provide my can with a heavily-trapped nozzle. I employ this term to designate a nozzle connected with a trap of such a character as to separate the gas space or chamber in the receptacle from the external air by such a body or depth of the liquid as shall render it impossible to ignite the confined gas, since the heat or fire from the outside of can cannot penetrate thereto.

My invention will be fully understood by reference to the accompanying drawings, in which is illustrated an embodiment thereof.

Figure 1:
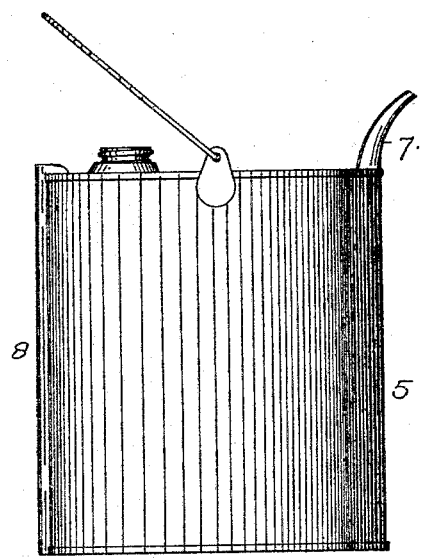
Figure 2:
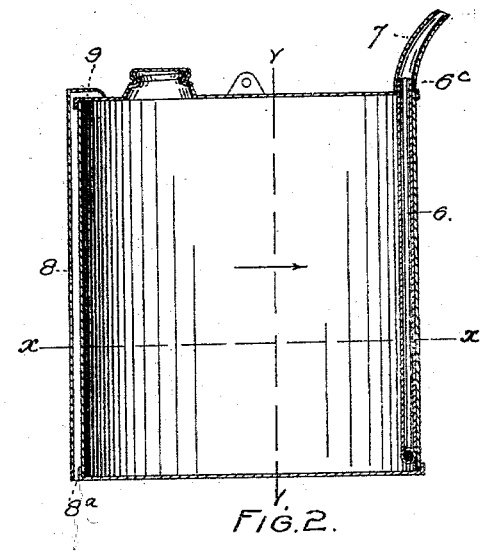
Figure 3:
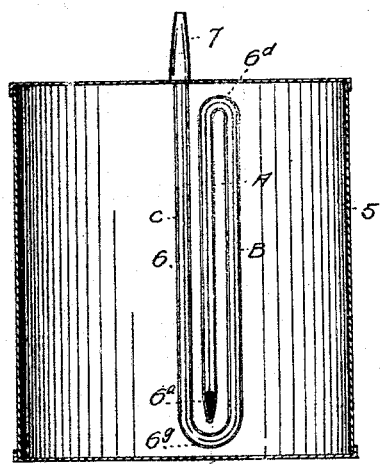
Figure 4:
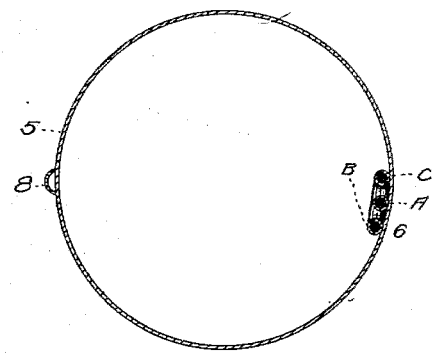
Figure 5:
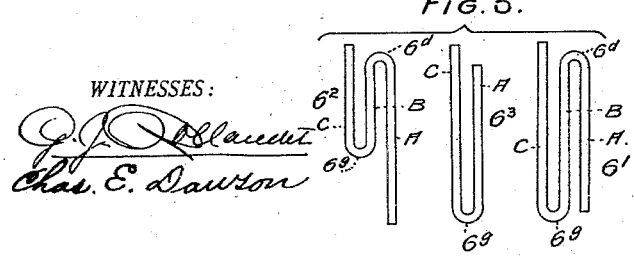

In the drawings, Figure 1 is a side elevation of my improved can. Fig. 2 is a vertical section taken through the can. Fig. 3 is a similar section taken on the line $y\,y$, Fig. 2. Fig. 4 is a horizontal section taken on the line $x\,x$, Fig. 2. Fig. 5 illustrates several forms of trap which may be employed in constructing the device.

Similar reference-characters indicate corresponding parts in these views.

Let the numeral 5 designate a can or receptacle of any suitable design or size. Located within this receptacle and attached to the wall thereof is the the trap 6. The extremity $6^a$ of the trap is open and communicates with the interior of the vessel. The opposite extremity $6^c$ of the trap projects through the top of the can and communicates with the nozzle 7, which is slipped thereover and fastened to the outer surface of the vessel's top. The trap may have one or more bends or turns, as may be desired. The form of trap shown in Fig. 3 comprises two bends $6^d$ and $6^g$ and three limbs A B C. The limbs are approximately equal in length, and the inlet-limb A is located between the outlet-limb C and the limb B. Referring to Fig. 5, the trap $6'$ also has three limbs, approximately equal in length, but limb B is located between inlet and outlet limbs A and C. The trap $6^2$ also has three limbs, but limbs B C are shorter than the limb A. The trap $6^3$ has only two limbs—namely, the inlet-limb A and the outlet-limb C. All these forms of trap are intended to accomplish the same purpose or subserve the same function. Air may be admitted to the can through an exterior channel or tube 8, whose upper extremity communicates with the interior of the can through an orifice 9, while its lower extremity is open to the outer air, as shown at $8^a$. The lower extremity of this channel is flush with the bottom of the can, and is therefore closed when the can is resting on a flat surface. This vent-channel is located diametrically opposite the trap. Hence the extremity $8^a$ thereof is as remote as possible from the extremity of the nozzle. Therefore if the liquid issuing from the can should become ignited there is little or no liability that the flame will reach the gas-space in the can *via* the vent-channel. This vent-channel obviates the necessity of loosening the screw-cap 12 of the can while pouring out the liquid, and is therefore an additional element of safety. If desired, the trap may be formed by pressing a groove or channel of the proper shape in the wall of the can, and then closing this channel by applying a strip of sheet metal lengthwise thereof on the inside of the can. It is preferred, however, to form the trap separately from the can, and fasten it to the wall thereof. This can be done before the bottom of the can is attached. As the liquid does not run from the nozzle until the can is in nearly a horizontal position, there can be no drip or loss by running down the nozzle or spout on the outside. It is not necessary to cover the nozzle, as there is no loss through evaporation except from a surface equal to the cross-sectional area of the outlet-limb of the trap.

Having thus described my invention, what I claim is—

1. The combination with a can or receptacle of the character described, of a bent tube or trap attached to the interior surface of the wall of the can on the side lowermost when the can is tipped to the pouring position, one limb of the tube being open on the inside of the can, while the other protrudes through an aperture in the top thereof, and a nozzle slipped over the protruding extremity of the discharge limb of the trap and fastened to the top of the can, substantially as described.

2. An oil can having an exteriorly located vent-channel communicating with the interior of the can through an orifice formed in the top thereof, its opposite extremity being flush with the bottom of the can, substantially as described.

3. As an improved article of manufacture, an oil can having an interiorly located trap through which the liquid passes to the nozzle, and an exteriorly located vent channel communicating with the interior of the can through an orifice formed in the top thereof, its opposite extremity being flush with the bottom of the can, substantially as described.

In testimony whereof I affix my signature in the presence of two witnesses.

ALBERT C. SMITH.

Witnesses:
CHAS. E. DAWSON,
ALFRED J. O'BRIEN.